Sept. 11, 1951 F. A. MILLER 2,567,440
VALVE CONTROL MEANS
Filed Sept. 5, 1946 2 Sheets-Sheet 1
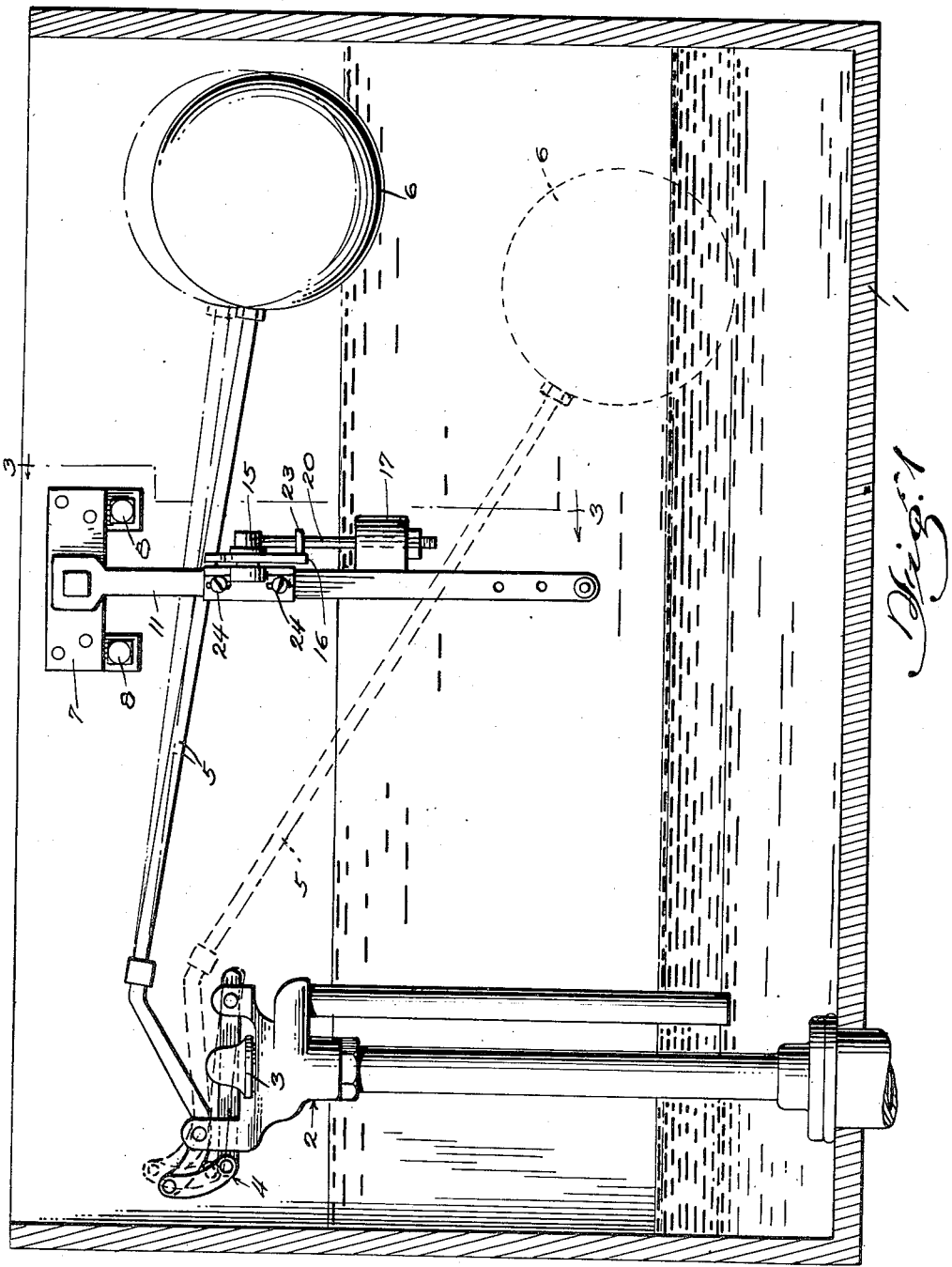
INVENTOR.
Frank A. Miller
BY
Robert J. Dennison
ATTORNEY Sept. 11, 1951  F. A. MILLER  2,567,440
VALVE CONTROL MEANS
Filed Sept. 5, 1946  2 Sheets-Sheet 2
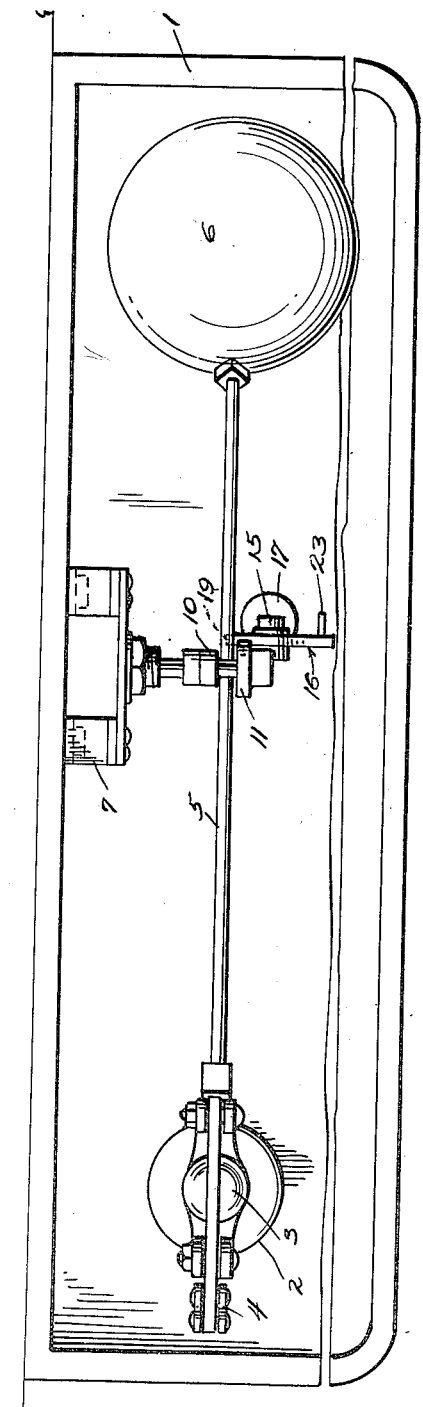
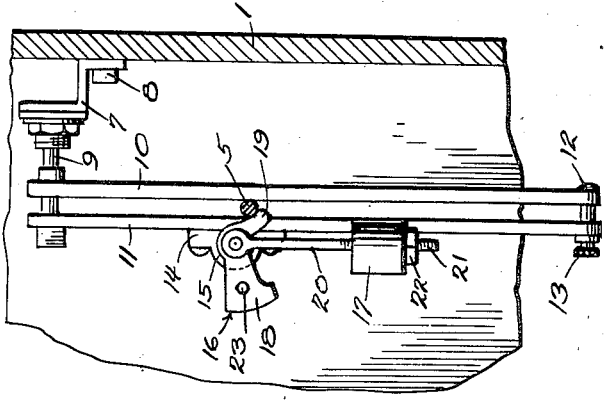
INVENTOR.
Frank A. Miller
BY
Robert L. Dennison
ATTORNEY Patented Sept. 11, 1951

2,567,440

UNITED STATES PATENT OFFICE 2,567,440

VALVE CONTROL MEANS

Frank A. Miller, Yakima, Wash.

Application September 5, 1946, Serial No. 694,974

5 Claims. (Cl. 137—104)

This invention relates to control means for inlet valves provided with a float that rises and descends with the level of a liquid in a tank cistern or other receptacle.

It has been experienced and found that ordinary float valves of this variety which are controlled directly by the level of the liquid in the tank do not conserve the inlet valve element and the valve seat for the same.

This objection is caused by the fact that the valve element seats very gradually and slowly close, and because of this slowness and gradual closing of the valve element, the erosion of the valve element or its valve seat or both of them occurs. When the erosion takes place, the valve leaks because it cannot be closed completely and such a condition causes the waste of liquid. Repairing or replacing of the inlet valve is an expensive operation which my invention eliminates most effectively.

It is an object of my invention to conserve the inlet valve, to conserve liquid and unnecessary expense caused by the erosion of essential valve parts especially the valve element and its valve seat.

It is an object of my invention to provide a unique attachment for liquid level float controlled inlet valves.

Other objects and advantages will be revealed in the detailed description of my drawings which constitute a part of my specification.

In the accompanying drawings forming a part of this specification and in which like reference characters designate corresponding parts throughout the several views:

Figure 1 is a side elevation view of my invention shown in a tank and secured thereto, the tank being in vertical longitudinal section;

Figure 2 is a plan view of my invention as installed in a tank and ready for use, the tank being foreshortened transversely; and Figure 3 is a vertical sectional view taken approximately on the line 3—3 of Figure 1 showing my invention as installed in a tank and in its control relation to the float rod or stem.

The drawings are merely illustrative and are not definitive of my invention except as claimed herein.

In the drawings, the tank 1 contains an inlet valve body 2 having a valve element 3 cooperating with a valve seat (not shown) but is located within the valve body 2. The valve element 3 is urged downwardly to its valve seat by a system of links and levers 4 connected to a float stem or rod 5. The stem 5 is connected to a float 6 which is forced upwardly by the rising liquid in the tank, cistern or receptacle.

My control attachment comprises a bracket 7 secured to the inside of the tank 1 by any suitable means such as lag bolts 8. The bracket 7 is provided with a forwardly projecting stud 9 which supports a pair of suitably spaced guide bars 10 and 11. The guide bars are spaced from each other a distance, at least, slightly more than the thickness of the float stem 5 so that the stem 5 may move freely in the path defined by the bars 10 and 11.

The lower ends of the bars are secured together in spaced relation by a bolt 12 having a nut 13. The guide bars 10 and 11 are maintained in spaced relation by washers or collars placed between the bars on the connecting means for the bars at both the top and bottom ends of the bars 10 and 11. Instead of using a bolt 12, a rivet (not shown) may be used.

The front bar 11 supports an adjustable bracket 14. The bracket 14 is provided with a laterally extending stub shaft 15 which pivotally supports in a pendant condition a trip lever 16 and a weight 17. One arm 18 of the trip lever 16 is weighted and the other arm is provided on its end portion with a double faced cam 19 which extends into the path of the guided float stem 5.

The weight 17 is preferably supported by a substantially rigid rod 20. The rod 20 is preferably provided with screw threads 21 receiving a nut 22 whereby the weight may be adjusted to different positions along the rod 20.

The weighted arm 18 of the trip or trigger lever 16 is provided with a laterally projecting stud or pin 23 located in the path of the weight suspending rod 20.

The position of the cam 19 is important since it must retard the movement upwardly of the float 6 and the stem 5 and maintain the valve element 3 open until the float 6 is submerged substantially half its volume, more or less, and until there is enough buoyant force on the float 6 to force the cam 19 out of the path of the stem 5 and quickly force the valve element 3 to its seat with ample force to prevent leakage.

In order to provide proper adjustment of the cam 19 in the path of the float stem 5, the bracket 14 may be slotted to receive the bolts or set screws 24. Of course, the bracket may be made in the form of a sleeve slidably and closely embracing the bar 11 whereby set screws could maintain the desired adjustment.

Of course, adjustments of the float and its stem could be made by suitable bending of the stem 5 intermediate the bars and the link and lever system 4.

It will be readily understood from the above description that many mechanical variations in the details of my invention may be made without departing from the essential principles of said invention.

I, therefore, contemplate the use of all variations which come within the scope of the subject matter claimed herein.

In the operation of my invention it is to be noted that the control means used by me closes the valve element quickly thereby preventing erosion of the valve element and its valve seat. The opening of the valve element is also retarded by the cam 19 since the cam is also in the path of the stem 5 as it descends, because of the weighted arm 18. When the weight of the float is sufficient it lifts the weighted arm 18 and escapes by the cam 19 to expeditiously open the valve which again eliminates conditions of liquid flow, which causes erosion, when a valve is only slightly open. In Figure 3, the stem 5 is in its initial position of descent and is about to slip by the cam 19.

As the float 6 and its stem 5 are lifted by the incoming liquid the stem eventually comes into physical contact with the cam 19 in its path. The rising stem 5 engages the lower side of the cam 19 and swings the pin 23 into physical contact with the pendant rod 20 and forces the weight 17 toward the back of the tank 1. When the buoyant force on the float is sufficient, the stem 5 escapes to a position above the cam 19 and thereby closes the valve expeditiously with a force measured in pounds instead of ounces.

It can now be observed that there are no independent parts but on the contrary every part co-operates to produce a most desirable result, namely, the conservation of the valve element 3 and its valve seat.

My invention can be used in closet cisterns or tanks, automatic intermittent tanks, water supply receptacles for animals, livestock, etc. In fact, it can be used in any container whose liquid level is controlled by a float.

Having shown and fully described my invention, what I claim is:

1. Means for controlling movements of a vertically movable operating lever comprising a bracket adapted to be mounted in a horizontal position above an operating lever and having a stud projecting therefrom, guide bars suspended from the stud for engagement with opposite sides of the lever to guide vertical movement of the lever, a second bracket carried by one guide bar and provided with a laterally projecting stub shaft, a hanger rod pivotally carried by and extending downwardly from the stub shaft and carrying a weight, a trip lever pivoted upon the stub shaft and having an outwardly extending weighted arm and an inwardly projecting arm extending across the guide bars and being curved longitudinally to provide upper and lower cam faces for engagement by the operating lever to interrupt upward and downward movement thereof, and a stud projecting laterally from the weighted arm of the trip lever, said stud being normally spaced from the hanger rod and being moved into engagement therewith during tilting of the trip lever as the operating lever moves upwardly.

2. Means for controlling movements of a vertically movable operating lever comprising a mounting member adapted to be mounted above an operating lever, a guide extending downwardly from said mounting for directing vertical movement of the lever, a bracket carried by said guide and shiftable to vertically adjusted position thereon, a pin projecting laterally from said bracket, a weighted rod pivoted upon and extending downwardly from said pin, a trip lever pivoted upon said pin and extending transversely of the guide and having inner and outer arms, the outer arm being weighted and the inner arm extending across the guide and upper and lower cam surfaces for engagement by the operating lever during vertical movement of the said operating lever, and a member at one side of the weighted arm for engaging the weighted rod and swinging the said rod upwardly out of its normal position during upward movement of the operating lever.

3. Means for controlling movements of a vertically movable operating lever comprising a guide, means for mounting the guide vertically in position to direct vertical movements of an operating lever, a member carried by and projecting laterally from said guide, a weighted rod pivotally carried by and depending from said member, a trip lever pivoted to said member and extending transversely of the guide and having an inner arm extending across the guide in position for engagement by the operating lever and a weighted outer arm, the inner arm being urged upwardly by the outer arm and having upper and lower cam surfaces for engagement by the operating lever during vertical movement of the operating lever, and a member at a side of the outer arm for engaging the rod and swinging the rod upwardly out of its normal position during upward movement of the operating lever.

4. Means for controlling movements of a vertically movable operating lever comprising a guide, means for mounting the guide vertically in position to direct vertical movements of an operating lever, a member carried by and projecting laterally from said guide, a weighted rod pivotally carried by and depending from said member, a trip lever pivoted to said member and extending transversely of the guide and having an inner arm extending across the guide in position for engagement by the operating lever to interrupt downward and upward movement of the operating lever, and an outer arm adapted for engagement with the weighted rod to swing the said rod upwardly out of its normal position during upward movement of the operating lever.

5. An attachment for receptacles adapted to contain a liquid admitted to the receptacle by the use of a float controlled inlet valve, said attachment comprising a bracket adapted to be secured to one wall of a receptacle, said bracket having a laterally projecting stud, said stud supporting a pair of guide bars in substantially spaced parallel relation and defining a path for a vertically oscillatable float stem, one of said bars supporting a control means for retarding the movement of the float stem in both its upward and downward movements, said control means comprising a bracket adjustably mounted on one bar, said last mentioned bracket having a stub shaft extending laterally therefrom and constituting a fulcrum upon which a trip lever is pivoted, one arm of said lever being weighted and its other arm having a double faced cam thereon and located in the path of said oscillating stem, said weighted arm having a pin extending laterally therefrom, in combination with a pendant weight suspended from said stub shaft by suitable suspension means pivoted on said stub shaft, said suspension means being located in the path of said laterally projecting pin.

FRANK A. MILLER.

REFERENCES CITED

The following references are of record in the file of this patent:

UNITED STATES PATENTS

| Number | Name | Date |
| --- | --- | --- |
| 533,360 | Knoblaugh | Jan. 29, 1895 |
| 1,161,554 | Voigt | Nov. 23, 1915 |
| 1,560,867 | Sketka | Nov. 10, 1925 |
| 1,616,698 | Miller | Feb. 8, 1927 |
| 2,013,188 | Reinhardt | Sept. 3, 1935 |

FOREIGN PATENTS

| Number | Country | Date |
| --- | --- | --- |
| 805,744 | France | of 1936 |